(12) United States Patent
Reiker

(10) Patent No.: US 6,335,486 B1
(45) Date of Patent: *Jan. 1, 2002

(54) SELF-GROUNDED PLASTIC ELECTRICAL BOX AND METHOD OF MAKING THE SAME

(75) Inventor: Kenneth H. Reiker, Shalimar, FL (US)

(73) Assignee: Reiker Enterprises of Northwest Florida, Inc., Solvay, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/904,691

(22) Filed: Aug. 1, 1997

Related U.S. Application Data

(63) Continuation-in-part of application No. 08/862,379, filed on May 23, 1997, now Pat. No. 5,965,845, and a continuation-in-part of application No. 08/862,378, filed on May 23, 1997, now Pat. No. 5,909,006, and a continuation-in-part of application No. 08/490,757, filed on Jun. 15, 1995, now Pat. No. 5,677,512, and a continuation-in-part of application No. 08/371,695, filed on Jan. 1, 1995, now Pat. No. 5,854,443.

(60) Provisional application No. 60/023,060, filed on Aug. 2, 1996.

(51) Int. Cl.[7] .................................................. H02K 5/02
(52) U.S. Cl. ................................ 174/51; 174/51; 220/3.2
(58) Field of Search ........................... 174/50, 51, 52.1, 174/58, 61–63, 65 R; 220/3.2, 3.9; 248/205.3

(56) References Cited

U.S. PATENT DOCUMENTS

| | | | |
|---|---|---|---|
| 950,176 | 2/1910 | Hublinger | 174/62 |
| 1,824,708 | 9/1931 | Davis et al. | 174/163 |
| 2,264,666 | 12/1941 | Hexdall | 411/66 |
| 2,959,633 | 11/1960 | Palmer et al. | 174/50 |
| 3,168,613 | 2/1965 | Palmer | 174/65 R |
| 3,340,349 | 9/1967 | Zerwes | 174/153 |
| 3,616,096 | 10/1971 | Roeder | 156/584 |
| 3,701,451 | * 10/1972 | Schindler et al. | 174/53 |
| 3,740,451 | 6/1973 | Schindler et al. | 174/58 |
| 4,050,603 | 9/1977 | Harris et al. | 220/3.9 |
| 4,062,470 | 12/1977 | Boteler | 220/3.3 |
| 4,062,512 | 12/1977 | Arnold | 248/309.1 |
| 4,096,964 | * 6/1978 | Glick | 220/3.4 |
| 4,140,293 | 2/1979 | Hansen | 248/217.2 |
| 4,176,758 | * 12/1979 | Glick | 220/3.3 |

(List continued on next page.)

OTHER PUBLICATIONS

Fan Brace Inc. /Manufacturers of the Original SAF–T–BRACE™, Fan Brace Inc., Bryan, Texas, 8 pages, printed 7/94.

Fan Brace Catalog/Fan Brace Inc., 16 pages, Fan Brace Inc. Bryan, Texas, undated.

Primary Examiner—Joseph Waks
(74) Attorney, Agent, or Firm—Shlesinger, Arkwright & Garvey LLP

(57) ABSTRACT

An electrical junction box or mounting assembly includes a box having a top wall and a side wall. The side wall extends downwardly away from the top wall and defines a cavity therein. A hole is provided in the side wall, and a fixture support is disposed in the hole. The fixture support may be made of metal, and the side wall and/or top wall may be made of plastic. The fastener may be a stud having a threaded hole therein. Flutes may be provided on the stud for engaging with the plastic/metal side wall for preventing rotation of the stud. An adhesive sufficiently strong to adhere the junction box to a downwardly facing surface may be provided on the top wall of the junction box. The adhesive may be in the form of double-sided tape. A method of extruding junction boxes includes extruding at least the side wall of the box and attaching a top wall thereto.

37 Claims, 6 Drawing Sheets

U.S. PATENT DOCUMENTS

| | | | |
|---|---|---|---|
| 4,275,862 | 6/1981 | Takagi et al. | 284/205.3 |
| 4,304,957 | 12/1981 | Slater et al. | 174/65 R |
| 4,306,109 * | 12/1981 | Nattel | 174/51 |
| 4,331,832 | 5/1982 | Curtis et al. | 174/57 |
| 4,348,547 | 9/1982 | Bowden, Jr. | 174/65 R |
| 4,366,343 | 12/1982 | Slater et al. | 174/65 R |
| 4,424,406 | 1/1984 | Slater et al. | 174/65 R |
| 4,684,092 * | 8/1987 | Reiker | 248/200.1 |
| 4,747,506 | 5/1988 | Stuchlik, III | 220/3.9 |
| 4,787,587 | 11/1988 | Deming | 248/205.1 |
| 4,909,405 | 3/1990 | Kerr, Jr. | 220/3.9 |
| 4,919,292 | 4/1990 | Hsu | 220/3.2 |
| 4,960,964 | 10/1990 | Schnell et al. | 174/51 |
| 4,988,067 | 1/1991 | Propp et al. | 248/343 |
| 5,044,582 * | 9/1991 | Walters | 248/57 |
| 5,065,968 | 11/1991 | Kesler et al. | 248/205.1 |
| 5,234,119 | 8/1993 | Jorgensen et al. | 220/3.9 |
| 5,303,894 | 4/1994 | Deschamps et al. | 248/303 |
| 5,407,088 | 4/1995 | Jorgensen et al. | 220/3.9 |
| 5,408,045 | 4/1995 | Jorgensen et al. | 174/58 |
| 5,435,514 | 7/1995 | Kerr, Jr. | 248/343 |
| 5,522,577 * | 6/1996 | Rosech | 248/343 |
| 5,762,223 | 6/1998 | Kerr, Jr. | 220/3.9 |
| 5,860,548 | 1/1999 | Kerr, Jr. | 220/3.5 |
| 5,907,124 * | 3/1999 | Reiker | 174/51 |

* cited by examiner

SELF-GROUNDED PLASTIC ELECTRICAL BOX AND METHOD OF MAKING THE SAME

CROSS-REFERENCE TO RELATED APPLICATIONS

This application is a continuation-in-part of application Ser. No. 08/862,379, filed May 23, 1997, now U.S. Pat. No. 5,965,845, and application Ser. No. 08/862,378, filed May 23, 1997, now U.S. Pat. No. 5,909,006, and application Ser. No. 60/023,060, filed Aug. 2, 1996, and application Ser. No. 08/490,757, filed Jun. 15, 1995, now U.S. Pat. No. 5,677,512, and application Ser. No. 08/371,695, filed Jan. 1, 1995, now U.S. Pat. No. 5,854,443, each of which is incorporated herein by reference.

This application likewise relates to four (4) concurrently Ser. No. 08/905,141 filed Aug. 1, 1997, now U.S. Pat. No. 6,204,450 B1; Ser. No. 08/905,077 filed Aug. 1, 1997, now U.S. Pat. No. 5,907,124 and Ser. No. 08/904,869 filed Aug. 1, 1997 now U.S. Pat. No. 5,883,331 each of which is incorporated herein by reference.

FIELD OF THE INVENTION

The present invention relates to electrical boxes and methods of producing the same.

BACKGROUND OF THE INVENTION

Consumers, updated National Electrical Codes (NEC), and Underwriter Laboratories (UL) requirements all require that electrical boxes be made stronger than in the prior art.

OBJECTS AND SUMMARY OF THE INVENTION

An object of the invention is to overcome the drawbacks of known electrical boxes.

A further object of the invention includes making electrical boxes which use the standard punched-out, stamped electrical boxes in a more intelligent fashion.

Yet another object of the invention is to take out the radius of a standard industry size electrical box so that a support for supporting a fixture can be located the proper distance from a second support to meet National Electrical Code (NEC) standards.

Another object of the invention is to eliminate the problem of pure plastic boxes being unusable for heavy-duty use.

Another object of the invention is to achieve a strengthened electrical box with a supplemental support within a standard so-called "4x4" box, while maintaining the near universal 3.5 inch (8.9 cm) spacing between the fixture supports so that the box is usable with standard light fixtures, ceiling fans, and the like.

It is likewise an object of the invention to provide metal supplemental supports in non-metallic and/or plastic electrical boxes to enhance the carrying strength of the electrical boxes.

Yet another object of the invention is to provide studs in the electrical boxes which cover the threads of standard screws so that no screw threads are present in the interior of such electrical boxes.

A still further object of the invention is to provide an electrical box having a sufficiently smooth interior for preventing wear to the plastic coating of plastic-coated electrical wire.

It is yet another object of the invention to provide electrical boxes in which added supports, such as studs, are added during the manufacturing process to eliminate problems in prior art electrical boxes, as well as to strengthen the inventive electrical boxes.

Another object of the invention is to provide a junction box having a supplemental support, yet which requires no welding during assembly thereof.

Yet another object of the invention is to provide an electrical box having components which are easily fabricated, added to the electrical box, and assembled in the final form by the operation of screwing or riveting, yet which do not loosen when subjected to static and/or dynamic loading.

A still further object of the invention is to provide a plastic junction box having metal components that is a "marriage" of plastic and metal and which enhances and exploits the properties of both materials.

A still further object of the invention is to provide a junction box capable of carrying static and/or dynamic loads having an auxiliary support and that is assembled with fewer parts and with fewer steps than known devices.

It is a yet further object that all the above be carried out with an electrical box which carries the static and dynamic load of supported fixtures better than known electrical boxes.

It is another object of the invention to provide a junction box which is made of plastic, yet which is self-grounded.

It is a still further object of the invention to maximize the use of non-metallic materials in a junction box, while minimizing the use of metallic materials in junction boxes.

A still further object of the invention is to provide a plastic junction box which can support both light fixtures and ceiling fans.

Another object of the invention is to provide a plastic junction box which includes a metal ground.

A further object of the invention is to provide a metal junction box having a securely attached metal ground, unlike prior art grounding clips.

A still further object of the invention is to provide for a method of extruding junction boxes, which had been unknown in the prior art.

Another object of the invention is to provide an extruded non-metallic junction box having a metal top wall.

A further object of the invention is to provide a non-metallic junction box having a non-metallic top wall with a metallic insert therein for serving as one or both of an electrical ground and an added strengthening element for supporting electrical fixtures carried by said junction box.

In summary, the present invention is directed to an electrical junction box or mounting assembly having a top wall and a side wall. The side wall may be plastic and extends downwardly away from the top wall and defines a cavity therein. A hole is provided in the side wall, and a fixture support is disposed in the hole. A threaded hole is provided on the fixture support, and the threaded hole is sized for mating with the threads of a fixture fastener. The fastener may be a screw. The top wall may be made of metal, and the side wall and/or top wall may be made of plastic. The fixture support may be a stud having the threaded hole therein. Flutes may be provided on the stud for engaging with the plastic/metal side wall for preventing rotation of the stud. An adhesive sufficiently strong to adhere the junction box to a downwardly facing surface may be provided on the top wall of the junction box. The adhesive may be in the form of double-sided tape. A method of forming the box includes extruding the body and attaching a metal top thereto.

These objects and advantages as well as others will be readily apparent from a review of the following description and drawings.

The drawings show a variety of embodiments of the invention, as will be clear from reading the description below.

It is important to note that the use of relative terms such as "up" and "down", and "left" and "right" is for convenience only and is not intended to be limiting.

DESCRIPTION OF THE PRIOR ART

Figure 1:
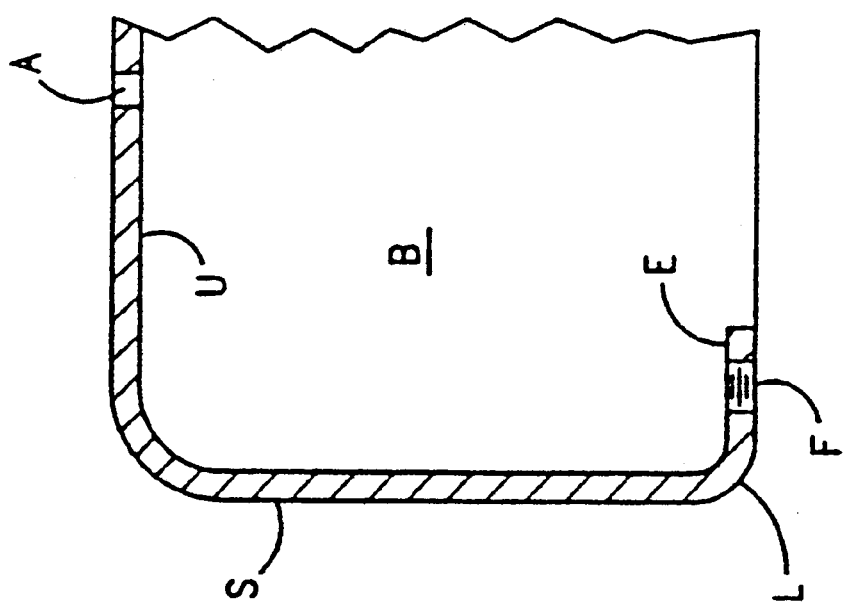
FIG. 1 is a cross sectional view of a PRIOR ART electrical junction box having an inwardly extending ear E with a face plate attachment hole F provided therein.

FIG. 1 shows a PRIOR ART junction box including a side wall S, an upper wall U, and an ear E extending from a lower portion L thereof.

Upper wall U has one or more attachment holes A through which fasteners will be inserted for attaching PRIOR ART electrical box B to an overhead surface, such as to a ceiling joist or piece of plywood extending therebetween.

A lower, faceplate attachment hole F is typically provided in inwardly extending ear E. Frequently, faceplate hole F is provided with threads for mating with respective faceplate fasteners when securing an unillustrated faceplate thereto. Such faceplates are used to enclose electrical box B after the wiring inside the electrical box/junction box B has been completed.

A drawback of such PRIOR ART electrical boxes E is that they are typically made with stamped sheet metal extensions E; consequently, extensions E are relatively thin (i.e., in the order of about 1 millimeter or less). Such extension or ear E has a width of only a few millimeters, and only extends several millimeters inside box B. Thus, the surface area of ear E, when viewed from below after installation of upper wall U against a typical horizontal ceiling, is often substantially less than one centimeter squared (1 cm$^2$).

Consequently, ear E may only carry relatively small vertical loads, when installed against the ceiling, as described above.

As a result, local codes frequently allow such PRIOR ART boxes B to be used only for supporting the weight of a faceplate, or of a relatively light static load, such as a small light fixture.

Such electrical boxes B are unsuited for supporting large static loads, as well as for supporting large dynamic loads, such as ceiling fans which may weigh twenty-five kilograms or more (25 kg).

Thus, there is a need for an electrical box which is suited for carrying relatively large static loads as well as dynamic loads.

That need is especially clear, given that many homeowners want to install heavier light fixtures and dynamic loads, such as ceiling fans, than had exhibited such preferences in the past.

Furthermore, even if the initial owner/builder of a house or commercial space provides PRIOR ART load-carrying junction boxes B suited for carrying the vertical force of a small light fixture, a subsequent owner/user will often replace the original light fixture with a heavier light fixture, or with a dynamic load; i.e. a ceiling fan.

Accordingly, there is a need for a load-carrying junction box which is suited for a wide range of static and dynamic loads and, thus, suited for original installation in new construction, given that some users fail to upgrade load-carrying junction boxes when adding heavier static and/or dynamic loads to the box.

The electrical box according to the invention has overcome these drawbacks described immediately above, and has achieved the objects of the invention detailed above. Such will be evident when reading the following detailed description of the invention.

DETAILED DESCRIPTION OF THE INVENTION

FIGS. 2–6 illustrate a first preferred embodiment of a junction box 50 according to the invention.

Junction box 50 includes a body 54 and a support system 58. Support system 58 may extend substantially across a width W of box 50. Body 54 may be made of a non-metallic material, such as a fiberglass reinforced plastic (FRP) and support system 58 may be made of a metal, such as steel.

Body 54 includes a top 62, a side wall 64, and a bottom or lower free edge 66.

One or more strengthened portions or extensions 68 may be provided on side wall 64. Extension 68 may extend outwardly therefrom, and may extend into a cavity 70 substantially defined by top wall 62 and side wall 64.

One or more holes 72 may be provided in extension 68.

A recess 76 may be provided in top wall 62 for receiving portions of support system 58 therein, as will be described below. One or more holes 82 for receiving fixture elements and/or fasteners 120 therethrough for securing box 50 to a support surface may be provided. A hole 82 may be provided for receiving additional fasteners and/or a grounding screw therethrough. One or more holes 88 may be provided for receiving electrical wiring and the like therethrough. Holes 88 have been shown as rectangular holes having downwardly extending walls 90 which preferably extend partially into junction box cavity 70.

Support system 58 includes a plate 92 having a hole 96 substantially aligned with hole 82, when assembled. Likewise there is provided a hole 98, preferably threaded for receiving a ground screw 150, which aligns with hole 84 of box 54.

One or more extensions 102 having ridged portions or ripples 106 may be provided on plate 92. Extensions 102 may be pre-bent downwardly, as shown, or the user may press the ones of extensions 102 downwardly which he or she wishes to use when installing and wiring box 50.

Figure 4:
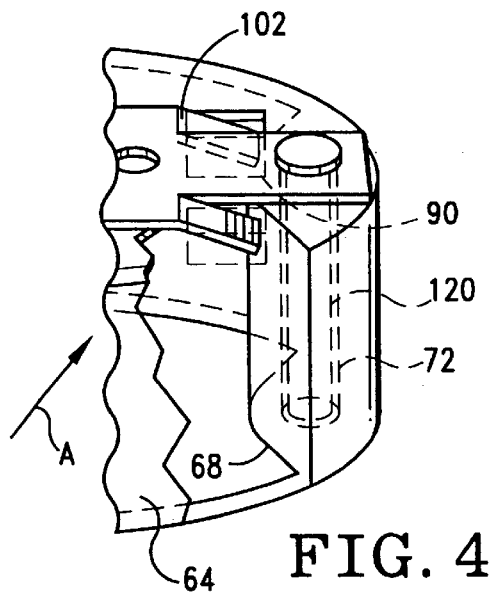
FIG. 4 is a partial perspective view of FIG. 2.
Figure 5:
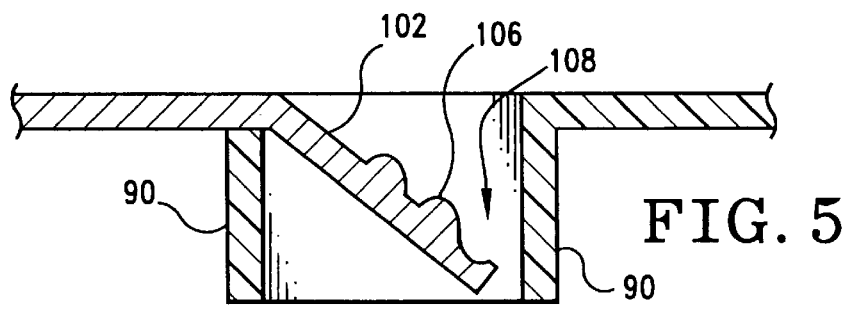
FIG. 5 is a cross-sectional view taken in the direction of line A of FIG. 2, showing a wire-receiving opening.
Figure 6:
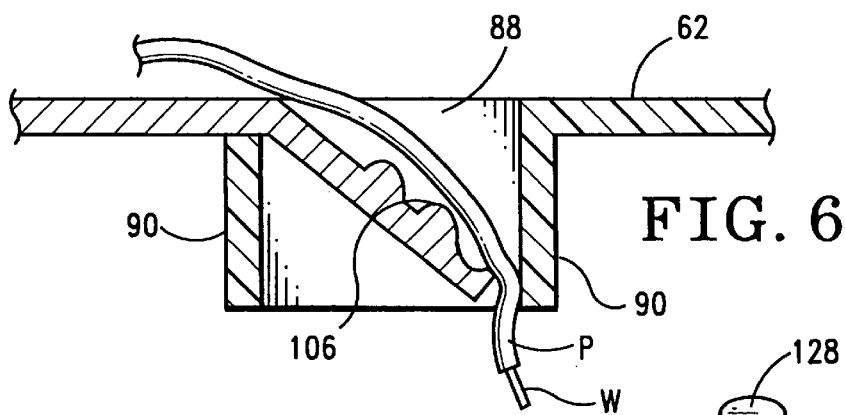
FIG. 6 is a cross-sectional view, similar to FIG. 5, of the wire-receiving opening in use.

Details of the location of extensions 102 relative to respective side walls 90, when assembled and/or in use, may be further appreciated by considering FIGS. 4–6. In use, conventional plastic-coated wire P is inserted in the opening or gap 108 defined between extension 102 and wall 90, FIG. 5 showing gap 108 prior to installation of plastic-coated wire P, and FIG. 6 showing plastic-coated wire P in place, having the free end of electrical wire W exposed.

A fixture support holder or tab 110 may be provided on plate 92. Such may be provided in the form of an extension 110 through which a fixture support 120, such as the illustrated stud, passes.

Figures 7, 8:
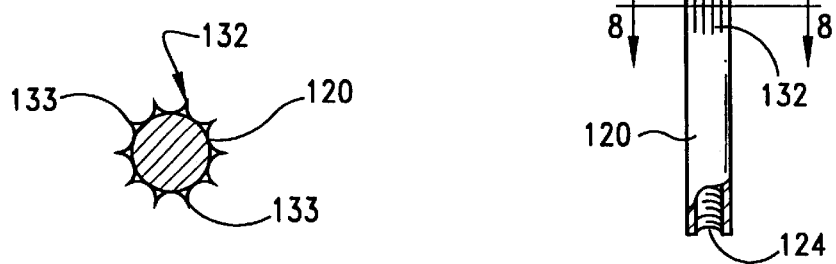
FIG. 7 is a perspective view of a fixture support.
FIG. 8 is a cross-sectional view taken along line 8—8 of FIG. 7.

Fixture support 120 may have a first end 121 and a second end 122. Second end 122 may have a lower threaded portion or threads 124 and first end 121 may have a head 128 for engaging with tab 110. Details of fixture support 120 are shown in FIGS. 7 and 8, which likewise illustrate that a fluting 132 having a series of individual flutes 133 may be provided.

Fluting 132 is especially useful for the case where body 54 is made of FRP. In such case, the individual flutes 133 engage with the side walls of hole 72. In such case, the hole in tab 110 may be made with a diameter larger than the extent of fluting 132, so that individual flutes are not dulled when passing through the typically metal material of tab 110, and the full length (i.e., outward extension) of flutes 133 is available for engaging with the plastic side walls of hole 72. Typically, about 1–14 flutes will be provided on a fastener shaft having an outside diameter (O.D.) of 0.25 inches. It is contemplated that 15 flutes 133 or more will be provided, depending on the intended use. As will be readily appreciated, to enhance the rotational resistance of fixture supports 120, fewer, longer (i.e., in the direction of outward extension and/or along the length of the shaft of fixture support 120) are preferable to a greater number of flutes 133 of shorter length and outward extension.

In the case where the holes of body 54 are formed in plastic material, such as fiberglass reinforced plastic (FRP), fluting 132 typically engages such plastic material even better than when holes are formed in a metal portion of their respective junction boxes.

A fixture fastener 140, ground screw 150 configured for passing through hole 84 and engaging with threaded hole 98, and a junction box fastener 160 may be provided.

In use, the user secures box 50 to a stud or the lower face of a ceiling joist, for example, by inserting one or more box fasteners 160 through holes 82 and 96. The grounding wire is secured to metal plate 92 by use of ground screw 150. The fixture, such as a light, chandelier, ceiling fan, and the like, is secured to fixture supports 120 by screwing fixture fasteners 140 into threads 124.

It will be appreciated that base 54 may be made of molded plastic.

It will likewise be appreciated that a great weight reduction, as compared with conventional boxes, has been realized by the use of a majority plastic box, with metal components at key locations thereof.

It will further be appreciated that box 50 solves the previously unsolved problem of having a self-grounded plastic box. Applicant has solved that problem thanks to the use of such key metal components. An electrical grounding path may flow as follows. A ceiling fixture contacts fixture fastener 140, which contacts metal fixture support 120, which contacts metal tab 110, which contacts hole 98 and, hence, ground screw 150, which contacts the third conventional grounding wire. Grounding is thus achieved.

Figure 9:
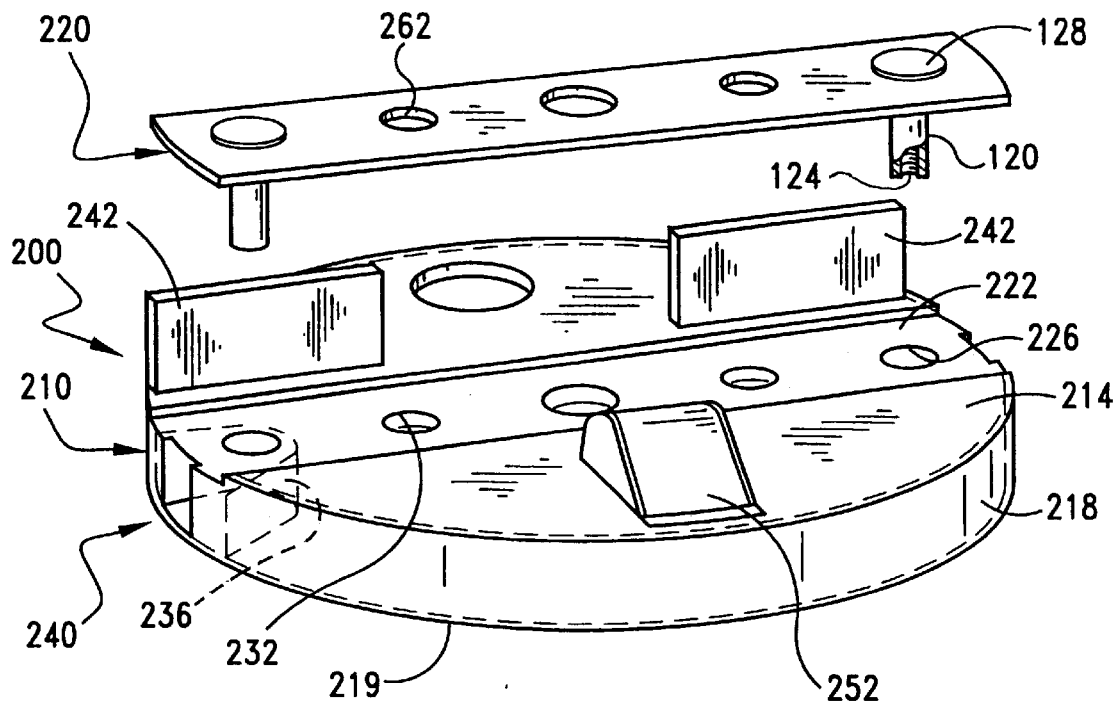
FIG. 9 is a perspective, exploded view of another junction box according to the invention.
Figure 10:
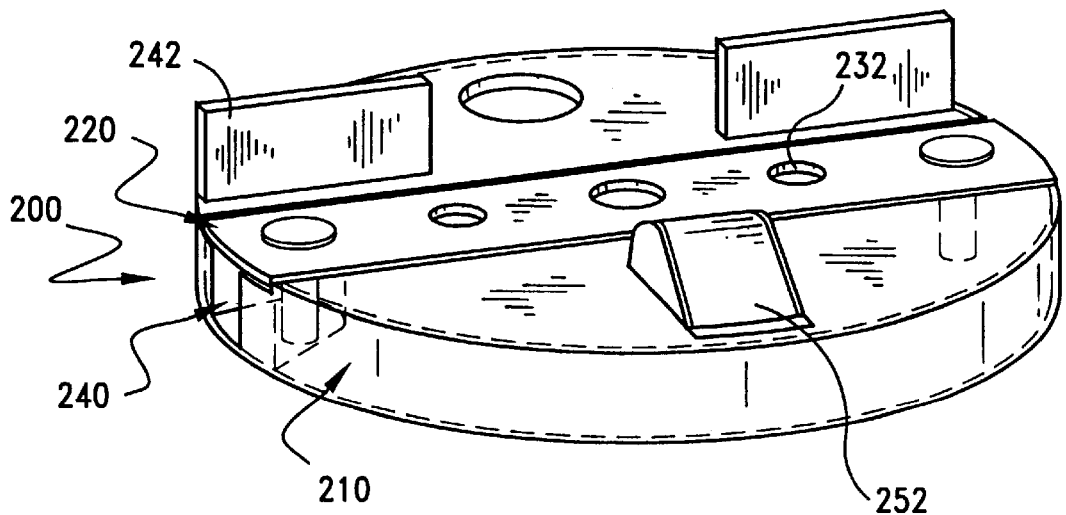
FIG. 10 is a perspective view of the junction box of FIG. 9.

FIGS. 9 and 10 illustrate another preferred embodiment of a junction box 200 according to the invention.

Box 200 includes a body 210 and a support system 220. Bottom 210, which may be made of FRP, includes a top wall 214, a side wall 218, and a bottom or lower free edge 219.

Top wall 214 may include a recess 222 through which a fixture support hole 226 extends, as well as other fastener holes such as hole 232 through which a joist fastener for attaching box 200 to a joist may be inserted.

An enlarged portion, or otherwise strengthened portion, such as an extension 236 may be provided in or may extend from wall 218. Hole 226 may extend therethrough.

An opening or window 240 may be defined in side wall 218 so that the user may view fixture support 120 therein, when installed as shown in FIG. 10. Preferably, fixture support 120 engages at least a portion of the side walls of hole 226 for securing support system 220 to body 210. Such connection may be made by an interference fit between a substantially smooth fixture support 120 engaging the side walls of hole 226, or may be accomplished by the use of fluting 132 as shown and described more particularly in reference to FIGS. 2, 7 and 8 above.

One or more guides or upwardly extending walls or first joist guides or first guides 242 may be provided on top wall 214. One or more spaced opposed second guides or joist guides or extensions 252 may be provided. Joist guides 242 and 252 assist the user in installing box 200. For example, joist guides 242 and 252 may be disposed, as shown, so as to guide the user in placing a ceiling joist J in between walls 242 and extension 252. In that manner, the lower face of the thus guided joist aligns with the holes 232 of body 210 and a respective aligned ones of holes 262 of support system 220.

Still further, joist guides 242 and 252 may be set apart from each other at a distance selected so that they will jointly snugly engage a joist J disposed therebetween, for assisting the user in attaching box 200 by nailing nails or driving screws through aligned holes 232 and 262. Such fasteners may be fasteners 160 as shown in FIG. 2.

Figure 2:
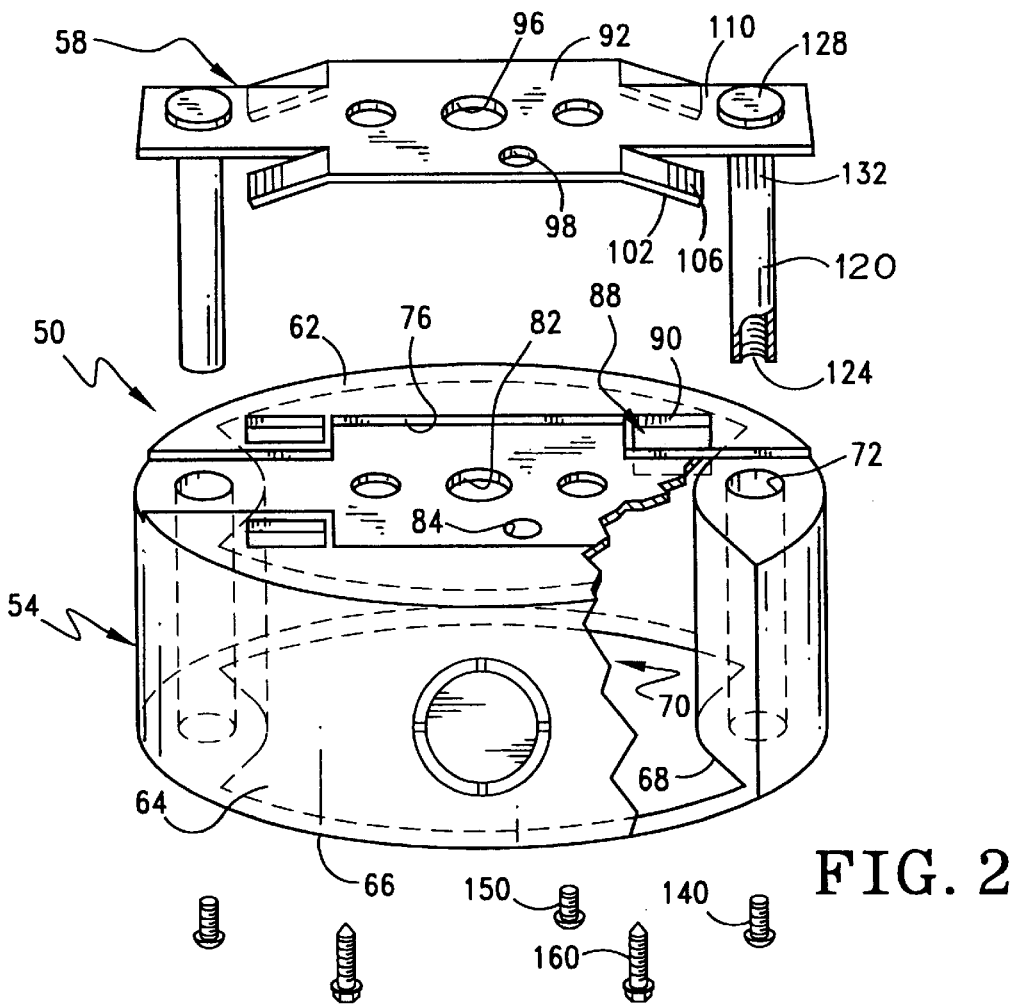
FIG. 2 is a perspective, exploded view of a preferred embodiment of an electrical junction box according to the invention showing the use of a metal support on the junction box.
Figure 3:
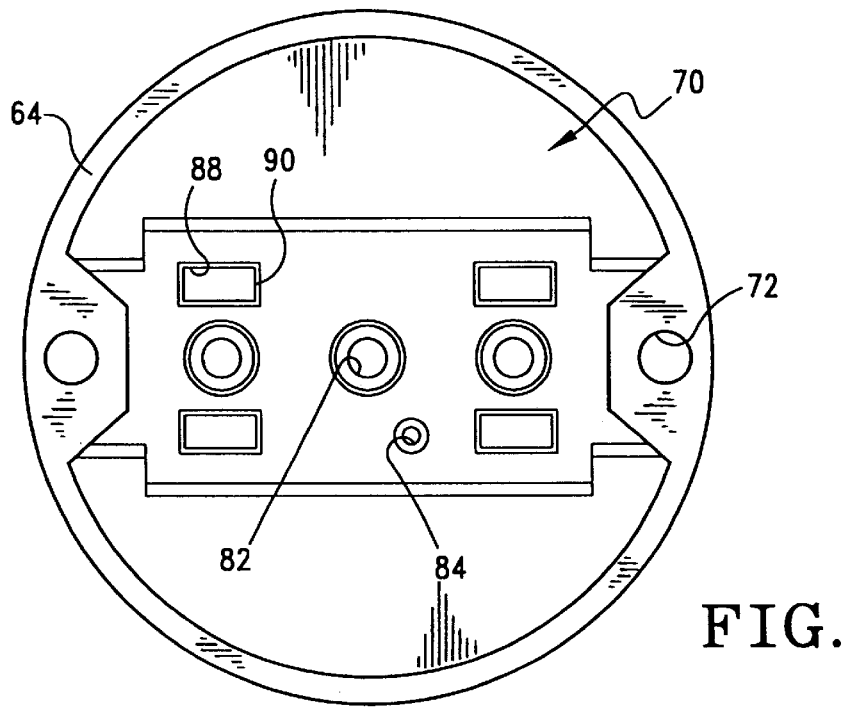
FIG. 3 is a bottom view of the body of FIG. 2.

When installing the fixture, such as a light, ceiling fan, and the like, the user may use fixture fastener 140 of FIG. 2.

Box 200 has all the benefits, and achieves all the objects of box 50 of FIGS. 2–8.

Figure 11:
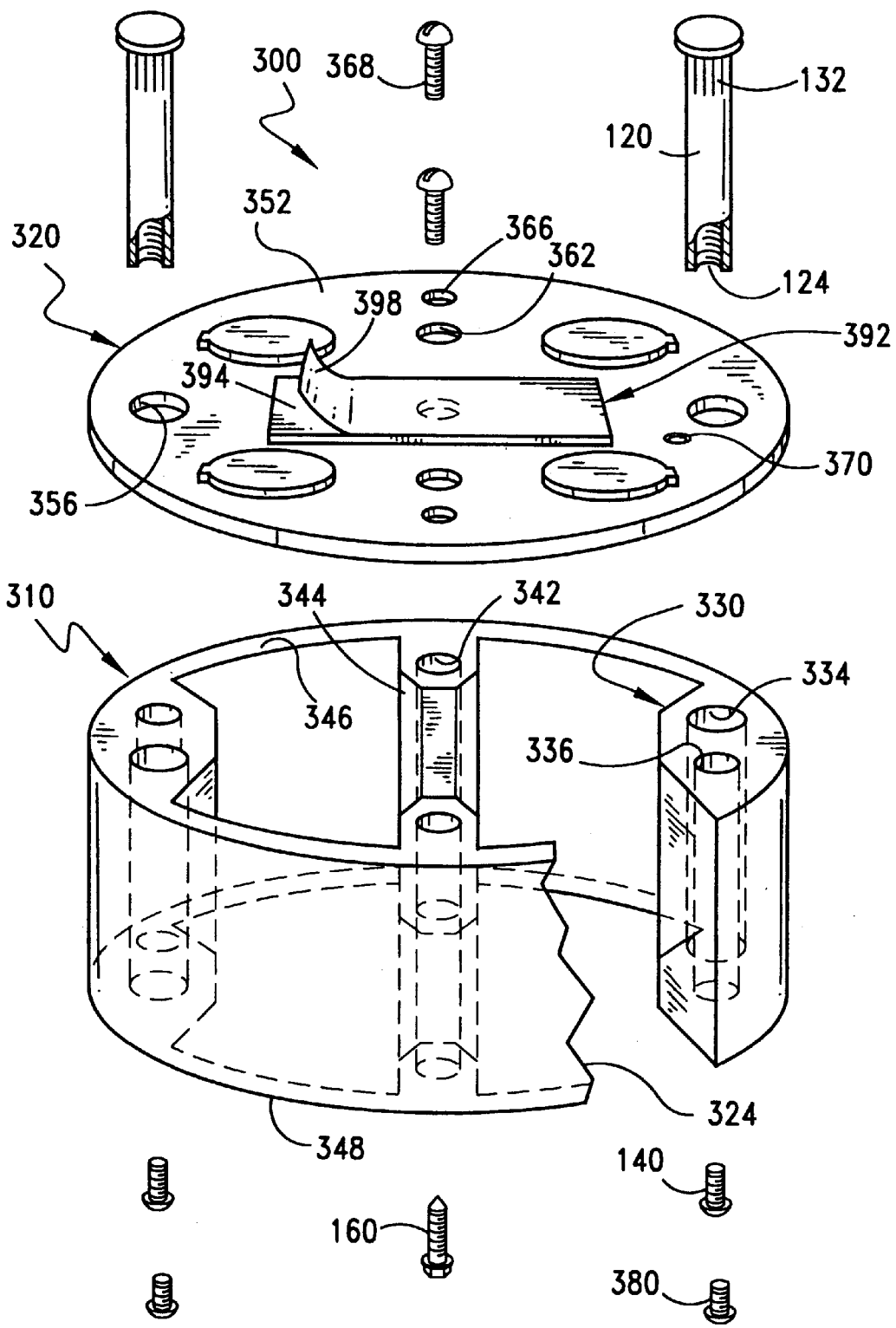
FIG. 11 is a perspective, exploded view, of yet another preferred embodiment of a box according to the invention.
Figure 13:
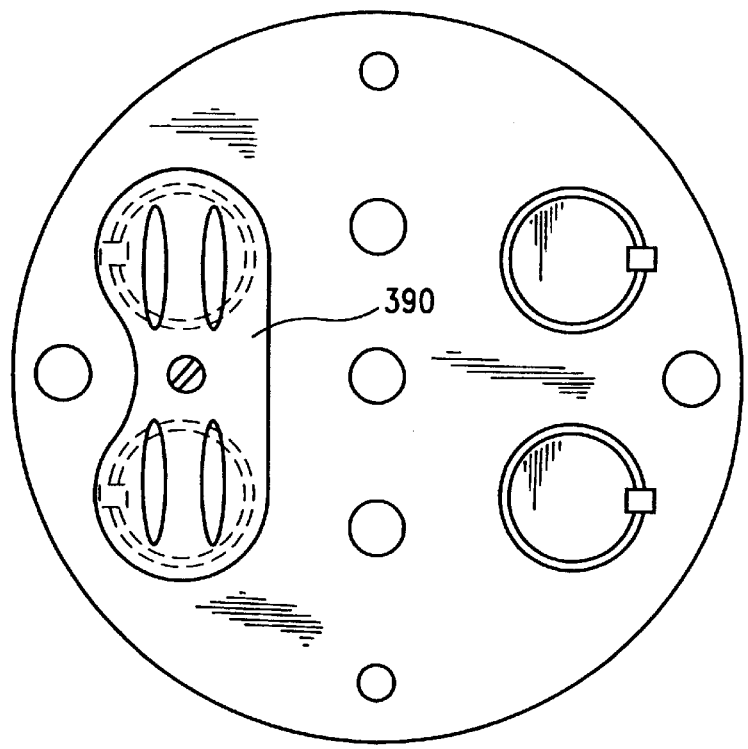
FIG. 13 is a top plan view of the support plate of FIG. 11.
Figure 12:
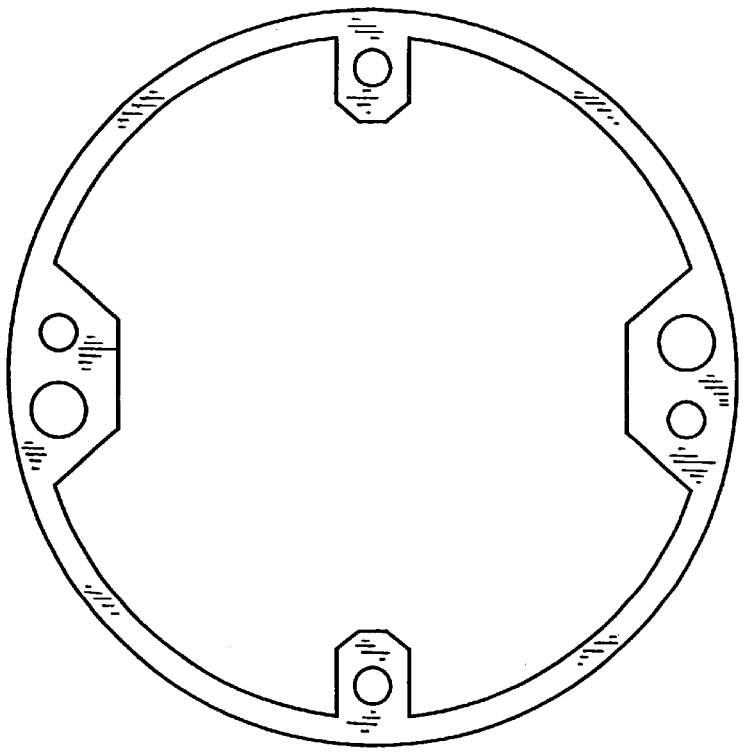
FIG. 12 is a bottom view of the body of the junction box of FIG. 11.

FIGS. 11–13 illustrate another preferred embodiment of a junction box 300 according to the invention.

Junction box 300 may include a body 310 and a support plate 320 disposed thereon.

Body 310 includes a side wall 324 and a fixture support securing portion 330, which may be in the form of a thickened portion of wall 324, or in the form of an extension 330 extending outwardly therefrom. Extension 330 may extend into the cavity of box 300. Extension 330 may include one or more holes for assisting in the securing of fixture supports, such as a hole 334 sized for receiving fixture support 120. Recall that fixture support 120 may include threaded hole 124 and fluting 132, as described above. A further hole 336 may be provided in extension 330. Hole 336 may have threads in a portion thereof for receiving a fixture fastener, as will be described below.

A further hole 342 may be provided in wall 318, or in a further strengthened portion thereof, such as in an extension 344.

Body 310/side wall 324 includes an upper free edge 346 and a spaced apart lower free edge 348.

Support plate 320 includes a top plate 352 defining the top of junction box 300, when joined thereto. Top plate 352 may have one or more holes 356 defined therein, through which fixture support 120 may pass. Additional holes may include a junction box fastener hole 362 through which a fastener 160 extends, in use, as well as one or more holes 366 through which one or more respective top plate fasteners 368 may pass for engaging the side walls of holes 342 in extension 344. Holes 342 may be substantially smooth, or threaded, depending on whether fasteners 368 are self-tapping screws, for example.

Likewise, holes 336 which may be provided without a metal insert, may be smooth, if fixture fasteners 380 are self-tapping. Otherwise, holes 336 may be provided with standard 8–32 threads for receiving standard 8–32 male threads on light fixture fasteners 380.

For ceiling fans, greater strength than that afforded by FRP is required by most electrical codes; hence, threads 124 of fixture supports 120 may be provided with 10–32 thread for mating with the standard 10–32 male threads of ceiling fan fixture fasteners 140.

It is also contemplated that self-tapping female inserts be used which tap into and engage the lower portion of holes 336 so as to provide 8–32 female threads for use in supporting light fixtures, as described above.

As discussed above regarding the earlier embodiments of the invention, hole 356 may be made larger than the outer extent of fluting 132 so as to not render fluting 132 less effective for engaging with the sides of holes 334.

A wire clamp 390 may be provided on the lower side of top plate 352, as shown in FIG. 13.

Body 310 may be molded of various plastics, such as FRP and other non-metallic materials.

However, body 310 is preferably extruded using a continuous extrusion process, and then body 310 is cut to the desired length (i.e., distance between free edges 346 and 348). Such results in energy savings, and lower fabrication and consumer costs, while maintaining and, indeed, enhancing, the desired load carrying characteristics, owing to the "marriage" of steel and plastic, e.g., a first material and a second material realized by the provision of metal cover 320.

The molding may be performed as follows using conventional equipment:
1. Select desired grade of plastic, such as FRP, and/or other non-metallic material;
2. Form extrusion nozzle/head having desired shapes of one or more of extensions 330, holes 334, holes 336, holes 342, extension 344, and side wall 324;
3. Place plastic material in extruder;
4. Extrude plastic material through extrusion nozzle/head in, optionally, substantially continuous process;
5. Allow extruded material to harden for a sufficiently long period of time so as to allow for working/cutting of extruded material;
6. Cut extruded material into desired length;
7. Form any desired ones of side wall 324, extensions 320, holes 334, holes 336, extensions 344, and holes 342 not formed in extrusion process, as required;
8. Attach top plate 352 to body 310 by use of one or more of fixture support 120 and fasteners 368, after sufficiently aligning fasteners with respective through holes.

An optional adhesive element 392 may be provided on top plate 352.

Double-sided tape 394 may be provided with a protective strip or layer 398 on the outer face thereof, i.e., on the face of double-sided tape 394 that has not been adhered to junction box 300. Conventional double-sided tape 394 may be used.

Alternative means for adhering junction box 390 to a surface may be used, such as spray-on adhesive, a piece of putty and other adhering means. Such adhesive may be as described in my earlier U.S. patent application Ser. No. 08/490,757, filed Jun. 15, 1995, and Ser. No. 08/371,695, filed Jan. 1, 1995, each of which is incorporated herein by reference, and such adhesive may be utilized in conjunction with or instead of the double-sided tape 394.

One of the many advantages of junction box 300 is that the user may remove protective layer 398, and then adhere double-sided tape 394 to the surface to which junction box 300 is to be attached. Double-sided tape 394 is selected and sized so that sufficient holding power for temporarily adhering junction box 300 to the surface is achieved, while the user has both hands free for permanently attaching junction box 300 in the desired location by nailing nails (or shooting screws) through one or more holes 362.

Preferably, the adhesive is sufficiently strong to adhere box 300 to a downwardly facing horizontal surface located above the user's head.

The thickness of double-sided tape 394 is coordinated with the thickness (i.e., height) of the head of fastener 368, and fixture support 120, as required, so that each performs its intended function, when junction box 300 is provided with such.

In a like manner, the height of the external portion of other supplemental supports will be coordinated with the thickness of adhesive material or double-sided tape 394. For example, the thickness of double-sided tape 394 typically will be selected to be at least as high, and preferably in most cases, higher than such height.

Alternatively, when attaching box 300 to a stud having a width less than the distance between left and right screws 368, double-sided tape 394 need not extend away from plate 352 a distance greater than the height of the heads of screws 368. That is because the stud would fit in between the offset left and right heads thereof.

As will be appreciated, adhesive 392 may be used with any of the above-described embodiments.

It will be appreciated that any of the above-described embodiments may have paired holes for receiving, alternatively, fan fixture fasteners 140 and light fixture fasteners 380.

It is contemplated that holes 342 be used for receiving light fixture fasteners 380, when extension 330 has only holes 334 therein for receiving fixture support 120.

It may be seen that an important result of the various embodiments, is that each embodiment has directly attached grounding elements, which solve the problem of easily lost prior art metal clips or add-ons for grounding.

Another important result of the embodiments, is the realization of the use of a larger proportion of less costly and more environmentally-friendly plastic material, with a reduced proportion of metal elements, so as to save on production and energy cost, and reduce the shipping weight which further reduces energy cost and, ultimately, the cost to producers and consumers.

As to the fixture supports, such as the illustrated supports 120, and so forth it is likewise contemplated that such supplemental supports will have other cylindrical shapes, hexagonal-shapes, square shapes, and shapes which are tapered at an upper portion thereof. The length of the fixture supports will be varied depending on the intended use and depth (height) of the box, as required.

It is contemplated that fixture supports 120, for example, be provided in opposed pairs, as shown, for attaching a first type of fixture, such as a ceiling fan; and, on that same box, a second pair of opposed fixture supports 120 have the same or different threads from the first pair will be provided. That second pair of fixture supports 120 may be provided adjacent to or spaced from the first pair. For example, it is contemplated that a spaced apart pair of fixture supports be located adjacent the box side wall and each fixture support being between the first pair of spaced apart fixture supports. In other words, FIG. 2 shows two (2) supports 120 which may be considered to be located at the free ends of a negative ("−") sign. Two (2) additional fixture supports 120 may be added, whereby four (4) supports 120 are present, one (1) of which is located at each of the four (4) free ends of a plus ("+") sign. The second pair would typically have a different thread size at the lower ends thereof, as compared with the first pair, so that one pair supports light fixtures, and the other pair supports ceiling fans, for example.

In addition to the screws used in the embodiments described above, it is expected that bolts or locking coupling nuts will be used to attach supplemental supports to the junction box, as well as any other means of fastening supplemental supports to the junction box in a sufficiently secure manner so as to achieve the objects of the invention.

It will be appreciated that these are merely examples of solutions to the problems set forth in my accompanying drawings and description, and, taken in its entirety, it will be appreciated that all the above objects of the invention, as well as many others, have been fulfilled.

It will likewise be appreciated that all the components described in the foregoing can be made of a variety of materials, such as steel, zinc, nylon, and other plastics, as the producer and user demand. For example, the box and the fixture support may be both made of plastic or both made of metal, or the box may be made of metal and the fixture support made of plastic, for example.

While this invention has been described as having a preferred design, it is understood that it is capable of further modification, uses and/or adaptations following in general the principle of the invention and including such departures from the present disclosures as come within known or customary practice in the art to which the invention pertains, and as may be applied to the essential features set forth, and fall within the scope of the invention or the limits of the appended claims.

I claim:

1. A mounting assembly, comprising:
   a) a box including a non-metallic top wall and a non-metallic side wall;
   b) said side wall extending downwardly away from said top wall and defining a cavity therein;
   c) a metal support disposed on said side wall;
   d) said metal support extending substantially across a width of the box and engaging said top wall;
   e) a fixture support having a first end and a second end, said first end being engaged with said metal support;
   f) a threaded hole provided on the second end of said fixture support; and
   g) said threaded hole being sized for mating with threads of a fixture fastener.
2. A device as defined in claim 1, wherein:
   a) said fixture support comprises metal.
3. A device as defined in claim 1, wherein:
   a) said top wall comprises plastic.
4. A device as defined in claim 3, wherein:
   a) said top wall comprises a metallic material.
5. A device as defined in claim 4, wherein:
   a) said fixture support engages said metallic top wall.
6. A device as defined in claim 5, wherein:
   a) said fixture support includes a female fastener at a lower portion.
7. A device as defined in claim 6, wherein:
   a) said fixture support includes a head which is disposed on an upper surface of the top wall.
8. A device as defined in claim 7, wherein:
   a) a window is provided in said side wall; and
   b) said fixture support is disposed in said window.
9. A device as defined in claim 1, wherein:
   a) said fixture support includes a stud having a head at a top portion;
   b) said threaded hole is disposed in a bottom portion of said stud; and
   c) said head engages said top wall of said box.
10. A device as defined in claim 1, wherein:
    a) an opening is defined in said side wall; and
    b) said opening defined in said side wall includes a portion which opens outwardly of said box.
11. A device as defined in claim 1, wherein:
    a) an adhesive is disposed on said top wall; and
    b) said adhesive is located and is sufficiently strong for adhering said junction box to a support surface.
12. A device as defined in claim 11, wherein:
    a) said adhesive includes double-sided tape.
13. A device as defined in claim 1, wherein:
    a) an adhesive is disposed on said top wall; and
    b) said adhesive includes double-sided tape and is located and is sufficiently strong for adhering said junction box to a support surface.
14. A device as defined in claim 1, wherein:
    a) a hole is defined in said side wall; and
    b) said fixture support is at least partially disposed within said hole.
15. A device as defined in claim 14, wherein:
    a) said fixture support is substantially completely disposed within said hole.
16. A device as defined in claim 1, wherein:
    a) said metal support is disposed on a non-metallic material disposed on said box; and
    b) said metal support is configured for engaging said fixture support for establishing a grounding connection with a fixture attached to said fixture support.
17. A device as defined in claim 1, wherein:
    a) an opening is provided on said metal support, and said opening is configured for securing a grounding screw thereto.
18. A device as defined in claim 17, wherein:
    a) said opening includes a threaded hole.
19. A device as defined in claim 1, wherein:
    a) an opening is provided in one of said top wall and said side wall of said box, said opening being configured for receiving a wire therethrough;

b) an extension is provided on said metal support, said extension being configured for extending at least partially into said opening in said one of said top wall and side wall; and c) said extension being configured for allowing a wire to be inserted into said opening and for restricting movement of the wire out of said opening, in use.

20. A device as defined in claim 19, wherein:

a) a ridged portion is provided on said extension for enhancing engagement between the wire and said extension, in use.

21. A mounting assembly, comprising:

a) a junction box including a top wall and a non-metallic side wall;

b) said side wall extending downwardly away from said top wall and defining a cavity therein;

c) a metal support disposed on said side wall;

d) a fixture support engaged with said metal support;

e) a threaded hole provided on said fixture support;

f) said threaded hole being sized for mating with threads of a fixture fastener;

g) said fixture support including a stud having a head at a top portion;

h) said threaded hole being disposed in a bottom portion of said fixture support; and i) said head engaging said top wall of said box.

22. A device as defined in claim 21, wherein:

a) said top wall comprises a non-metallic material.

23. A device as defined in claim 22, wherein:

a) said non-metallic material of said top wall comprises plastic.

24. A device as defined in claim 21, wherein:

a) a hole is defined in said side wall; and b) said fixture support is at least partially disposed within said hole.

25. A device as defined in claim 24, wherein:

a) said fixture support is substantially completely disposed within said hole.

26. A device as defined in claim 21, wherein:

a) said non-metallic material of said side wall comprises an extruded non-metallic material.

27. A device as defined in claim 26, wherein:

a) said extruded non-metallic material of said side wall comprises plastic.

28. A device as defined in claim 21, wherein:

a) an opening is provided in the top wall; and b) said fixture support is disposed in the opening.

29. A device as defined in claim 21, wherein:

a) an opening is provided on said metal support, and said opening is configured for securing a grounding screw thereto.

30. A device as defined in claim 21, wherein:

a) an opening is provided in said side wall; and b) said fixture support is disposed in said opening in said side wall.

31. A device as defined in claim 21, wherein:

a) an opening is provided in said top wall; and b) said fixture support is disposed in said opening in said top wall.

32. A device as defined in claim 21, wherein:

a) said fixture support includes a stud.

33. A device as defined in claim 32, wherein:

a) at least one flute is provided on said stud, said at least one flute being configured for engaging said at least one of the top wall and the side wall.

34. A device as defined in claim 21, wherein:

a) said top wall comprises a substantially flat plate.

35. A device as defined in claim 21, wherein:

a) at least one guide is disposed on said top wall, and said at least one guide is configured for engaging a portion of a support to which said box is attached, in use.

36. A device as defined in claim 35, wherein:

a) said at least one guide includes a first guide and a spaced apart second guide; and b) said first guide and said second guide being sufficiently far apart so that a joist will fit therebetween, in use.

37. A device as defined in claim 21, wherein:

a) said top wall comprises a metallic material.

* * * * *